United States Patent [19]
Hemingway et al.

[11] Patent Number: 5,510,086
[45] Date of Patent: Apr. 23, 1996

[54] ADCAT EXHAUST TREATMENT DEVICE

[75] Inventors: Mark D. Hemingway, Burton; George A. English, Davison, both of Mich.

[73] Assignee: General Motors Corporation, Detroit, Mich.

[21] Appl. No.: 419,562

[22] Filed: Apr. 10, 1995

[51] Int. Cl.⁶ .............................. B01D 50/00; F01N 3/10
[52] U.S. Cl. .................... 422/171; 422/169; 422/170; 422/177; 422/180; 422/189; 422/190; 60/297
[58] Field of Search ................................ 422/168–171, 422/177, 180–188, 190, 211, 222; 60/297, 299; 502/439, 527; 55/DIG. 30

[56] References Cited

U.S. PATENT DOCUMENTS

| | | | |
|---|---|---|---|
| 4,556,543 | 12/1985 | Mochida et al. | 422/171 |
| 5,125,231 | 6/1992 | Patil et al. | 60/274 |
| 5,229,079 | 7/1993 | Harada et al. | 422/180 |
| 5,233,830 | 8/1993 | Takeshima et al. | 422/171 |
| 5,296,198 | 3/1994 | Abe et al. | 422/180 |

*Primary Examiner*—Robert J. Warden
*Assistant Examiner*—Hien Tran
*Attorney, Agent, or Firm*—Cary W. Brooks

[57] ABSTRACT

The invention relates to a catalytic converter system for controlling exhaust emissions from a combustion engine wherein the catalytic converter has three catalysts zones. A zone which is first in line with the direction of the flow of exhaust and which includes a light-off catalyst such as palladium. A second zone in line of the direction of the exhaust flow includes a hydrocarbon adsorber/catalyst. A third zone in line of the direction of the exhaust flow includes a catalyst system converter CO and $NO_x$. The three-zone system of the present invention produces hydrocarbon efficiencies above 98 percent and retains hydrocarbon efficiencies above 50 percent in cold performance situations immediately after start-up of the combustion engine.

6 Claims, 1 Drawing Sheet

ADCAT EXHAUST TREATMENT DEVICE

FIELD OF THE INVENTION

This invention relates to vehicle combustion engine exhaust treatment systems including hydrocarbon conversion catalysts.

BACKGROUND OF THE INVENTION

It is known to use a honeycomb-shaped substrate having a washcoat thereon which includes a zeolite or equivalent material which is coated or impregnated with a palladium catalyst. Such devices are very useful in converting hydrocarbon constituents in the exhaust gas from a combustion engine. However, under relatively high flow conditions, such devices have hydrocarbon converging efficiencies of less than 50 percent during the first 140 seconds of operation of the combustion engine. This is undesirable because the system does not meet Federal emission standards.

The present invention provides advantages over the prior art.

SUMMARY OF THE INVENTION

The invention relates to a catalytic converter system for controlling exhaust emissions from a combustion engine wherein the catalytic converter has three catalysts zones. A zone 20 which is first in line with the direction of the flow of exhaust includes a light-off catalyst which preferably includes palladium. A second zone 22 in line of the direction of the exhaust flow includes a hydrocarbon adsorber/catalyst. A third zone 24 in line of the direction of the exhaust flow includes a catalyst system for converting CO and $NO_x$. The three-zone system of the present invention produces hydrocarbon efficiencies above 98 percent and retains hydrocarbon efficiencies above 50 percent in cold performance situations immediately after start-up of the combustion engine.

These and other objects, features and advantages of the present invention will be apparent from the following brief description of the drawings, detailed description, appended claims and accompanying drawings.

DETAILED DESCRIPTION

Figure 1:
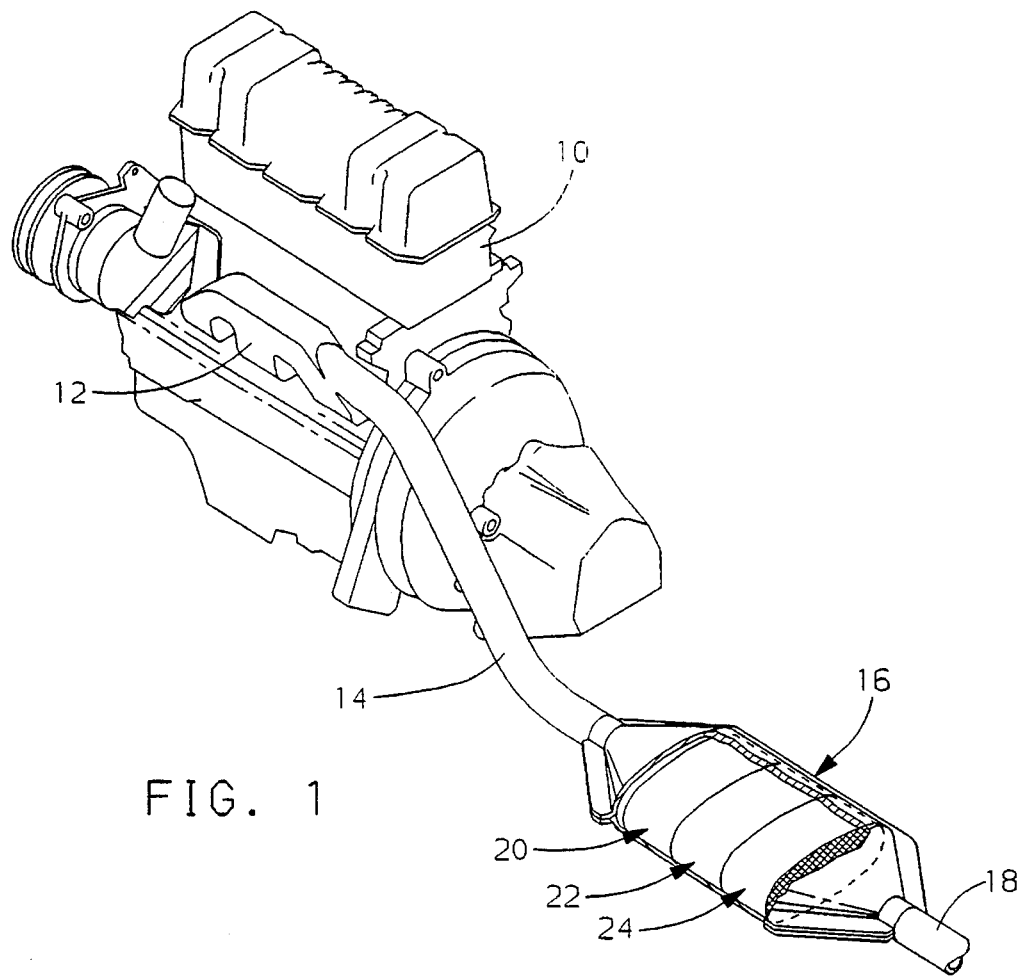
FIG. 1 illustrates a vehicle combustion exhaust controlling system including a three-zone catalyst system according to the present invention.

FIG. 1 illustrates a system according to the present invention which includes a combustion engine 10, an exhaust capture system including a manifold 12 and exhaust piping 14 leading from the combustion engine, a catalytic converter 16 and an exhaust pipe 18. The catalytic converter includes a substrate which is preferably a honeycomb, open-cell ceramic monolith. The three catalyst zones are defined within the catalytic converter. The zones 20, 22, 24 may be defined on a single substrate or each zone may be formed on a separate catalytic converter substrate or brick. Preferably each substrate is cordierire with at least 400 cells/in$^2$ and each substrate has a length of about 3–6 inches so that the total converter length ranges from 9–18 inches long. Each zone or brick has a different washcoat applied thereto and the bricks are butted together in a single package converter.

Washcoat slurries are prepared by mixing about 35–50 percent by weight solid powders in water. The slurries are milled, if necessary, to break down agglomerates and/or reduce particle size of suspended powders. The slurries are pulled through the substrate by a vacuum wherein the solid particles enter pores in the substrate and adhere thereto. The coated substrate is dried in an oven and then calcined in a kiln to further improve adherence of the washcoat. Precious metals are deposited on the coated substrate by post-impregnation such as dipping the substrate in a precious metal solution (i.e., precious metal chloride and amine nitride salts). Excess precious metal solution is shaken off of the substrate and the substrate is dried, and calcined to produce a finished coated substrate.

The first zone 20 is prepared by applying a washcoat including non-ceria, δ alumina to the substrate. Including ceria in the washcoat adversely effects the downstream zeolite. The washcoat is then post-impregnated with a light-off catalyst which is preferably palladium. Preferably, the first zone has a palladium loading greater than 150 grams/ft$^3$.

The second zone 22 of the catalyst is prepared by coating the substrate with a washcoat including a zeolite, which is preferably Y-type or faujasite, in about 92–100 percent by weight of the washcoat for adsorption of cold-start hydrocarbons. Aluminum oxide hydrate may be added to the washcoat in an amount of about 0–10 weight percent to improve the washcoat adherence. The washcoat is post-impregnated with palladium to a loading greater than 50 grams/ft$^3$.

The third zone 24 is provided by applying a washcoat consisting of about 20–40 weight percent, preferably 30 percent, of cerium oxide for oxygen storage, about 50–75 percent, preferably 65 percent, of aluminum oxide for support of precious metals and thermal stability, about 5–10 weight percent, preferably 5 percent, of aluminum oxide hydride to improve washcoat adhesion, and optionally about 1–3 percent nickel oxide for $H_2S$ motor suppression. The washcoat is impregnated with a platinum/rhodium catalyst system to a loading of about 25–50 grams/ft$^3$ wherein the Pt:Rh weight ratio ranges from about 5:1 to 10:1.

Figure 2:
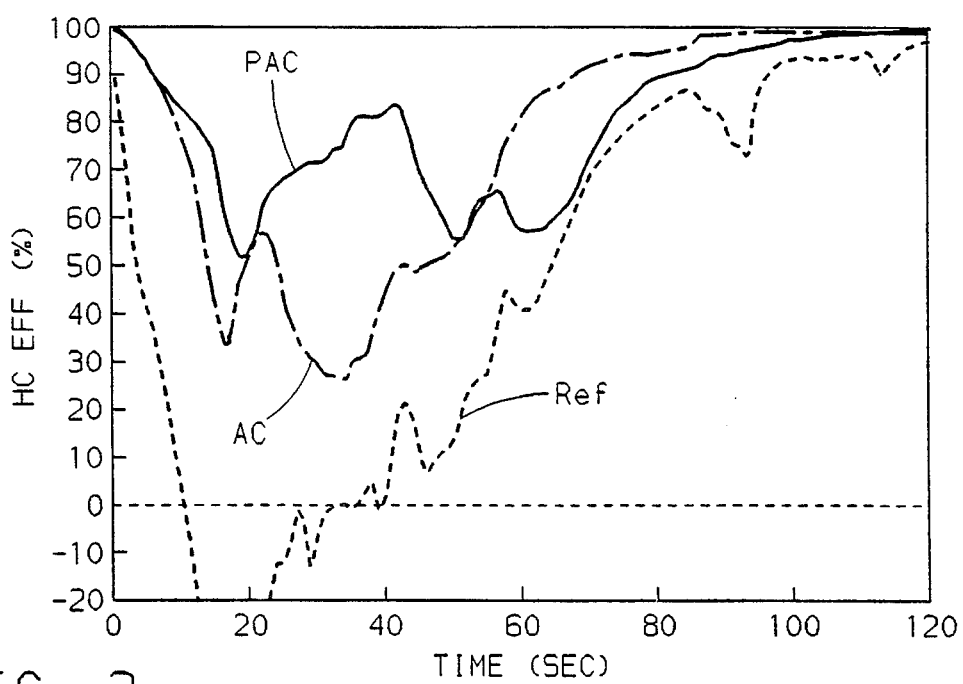
FIG. 2 is a graphical illustration comparing the performance of a catalytic converter system according to the present invention with a three-way catalyst system and a system according to the present invention including an adsorber/catalyst section and a conventional catalyst system for converting CO and $NO_x$.

As is illustrated by FIG. 2, the three zone catalytic converter system (PAC) according to the present invention produces hydrocarbon conversion efficiencies greater than 98 percent and retains a hydrocarbon efficiency above 50 percent in cold performance situations such as that exists immediately after the combustion engine is started. The three zone catalytic system (PAC) of the present invention is compared with a reference three-way catalyst using Pt-Rh or Pd-Rh (Ref.) and a two zone system having a first zone with a Pd catalyst and a second zone having Pt and Rh (AC).

It is believed that the present invention produces improved hydrocarbon conversion performance because the palladium in the first zone creates such a heat wave in the overall catalytic converter system. Consequently that hydrocarbons collected in the second zone do not have a chance to desorb during warmer performance situations and thus greater amounts of the hydrocarbons are catalyzed.

What is claimed is:

1. A catalytic converter system for controlling vehicle exhaust emissions comprising:

a catalyst package comprising a substrate;

said substrate having first, second and third catalytic zones positioned respectively within the direction of exhaust flow traveling through the catalyst system; said zones being defined within said substrate by different coatings on said substrate, said first zone having a light-off catalyst coating said second zone having an adsorber/catalyst coating for adsorption of hydrocarbon, said third zone having a catalyst coating for converting CO and $No_x$ constituents in the exhaust flow, and said second zone being immediately adjacent to said first and third zones.

2. A catalytic converter system as set forth in claim 1 wherein said light-off catalyst coating comprises palladium.

3. A catalytic converter system as set forth in claim 1 wherein said adsorber/catalyst coating comprises an adhered washcoat including a zeolite, for adsorption of hydrocarbon, and palladium.

4. A catalytic converter system as set forth in claim 1 wherein said third zone comprising the catalyst coating for controlling CO and $No_x$ exhaust constituents comprises platinum and rhodium wherein the platinum:rhodium rate ratio ranges from 5:1 to 10:1.

5. A catalytic converter system as set forth in claim 2 wherein said first zone is constructed and arranged to create a heat wave sufficient to prevent hydrocarbons collected in the second zone from desorbing during warmer performance situations.

6. A catalytic converter system as set forth in claim 2 wherein said palladium is coated on said substrate in an amount greater than 150 grams/ft$^3$.

\* \* \* \* \*